(12) United States Patent
Shinya

(10) Patent No.: US 10,495,926 B2
(45) Date of Patent: Dec. 3, 2019

(54) IMAGE DISPLAY APPARATUS

(71) Applicant: PANASONIC INTELLECTUAL PROPERTY MANAGEMENT CO., LTD., Osaka (JP)

(72) Inventor: Takeichi Shinya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/096,226

(22) PCT Filed: Feb. 6, 2018

(86) PCT No.: PCT/JP2018/004004
§ 371 (c)(1),
(2) Date: Oct. 24, 2018

(87) PCT Pub. No.: WO2018/147273
PCT Pub. Date: Aug. 16, 2018

(65) Prior Publication Data
US 2019/0146275 A1    May 16, 2019

Related U.S. Application Data

(60) Provisional application No. 62/456,912, filed on Feb. 9, 2017.

(30) Foreign Application Priority Data

Aug. 24, 2017 (JP) ................................. 2017-161513

(51) Int. Cl.
  *G02F 1/1335*  (2006.01)
  *H01R 13/04*  (2006.01)
  (Continued)

(52) U.S. Cl.
  CPC .. *G02F 1/133603* (2013.01); *G02F 1/133308* (2013.01); *G02F 1/133608* (2013.01);
  (Continued)

(58) Field of Classification Search
  CPC ......... G02F 1/133603; G02F 1/133308; G02F 1/133608; G02F 2202/28; H01R 12/728; H01R 13/20; H01R 13/04; H01R 13/114
  See application file for complete search history.

(56) References Cited

U.S. PATENT DOCUMENTS

2009/0135331 A1    5/2009  Kawase

FOREIGN PATENT DOCUMENTS

| JP | 2008-204716 A | 9/2008 |
| JP | 2009-129705 A | 6/2009 |
| JP | 2016-062765 A | 4/2016 |

OTHER PUBLICATIONS

International Search Report and Written Opinion issued in International Patent Application No. PCT/JP2018/004004, dated May 1, 2018; with partial English translation.

*Primary Examiner* — Tracie Y Green
(74) *Attorney, Agent, or Firm* — McDermott Will & Emery LLP

(57) ABSTRACT

An image display apparatus includes: a display panel; an LED substrate disposed on a back surface side of the display panel and on which an LED is mounted; a relay substrate disposed on the back surface side and on which a circuit unit is mounted; a first metal member disposed on the LED substrate and electrically connected with the LED; a second metal member disposed on the relay substrate, electrically connected with the circuit unit; and a reflective sheet that is electrically insulative and disposed between the display panel and both of the LED substrate and the relay substrate so as to cover at least the first metal member and the second metal member, the reflective sheet reflecting light from the (Continued)

LED toward a back surface of the display panel. When the first metal member and the second metal member are fitted with each other, an index hole is covered.

4 Claims, 9 Drawing Sheets

(51) Int. Cl.
  *G02F 1/1333* (2006.01)
  *H01R 12/72* (2011.01)
  *H01R 13/20* (2006.01)
  *H01R 13/11* (2006.01)
(52) U.S. Cl.
  CPC ........... *H01R 12/728* (2013.01); *H01R 13/04* (2013.01); *H01R 13/20* (2013.01); *G02F 2202/28* (2013.01); *H01R 13/114* (2013.01)

IMAGE DISPLAY APPARATUS

CROSS-REFERENCE OF RELATED APPLICATIONS

This application is the U.S. National Phase under 35 U.S.C. § 371 of International Patent Application No. PCT/JP2018/004004, filed on Feb. 6, 2018, which in turn claims the benefit of U.S. Provisional Application No. 62/456,912, filed Feb. 9, 2017 and Japanese Application No. 2017-161513, filed on Aug. 24, 2017, the entire disclosures of which Applications are incorporated by reference herein.

TECHNICAL FIELD

The present disclosure relates to an image display apparatus that displays an image and a connecting pin.

BACKGROUND ART

Patent Literature (PTL) 1 discloses an image display apparatus including: a display panel; a lower frame disposed on the back surface side of the display panel, a direct backlight supported by the lower frame; and a reflective sheet that is disposed between the display panel and the backlight and reflects light from the backlight toward the back surface of the display panel.

The backlight includes a plurality of substrates and light emitting diodes (LEDs) mounted on the plurality of substrates. A connector electrically connected with LEDs is mounted on each of the plurality of substrates. The connector includes a metal terminal and a resin housing covering the metal terminal. The connector on one substrate is electrically connected with the connector on another substrate via a lead wire having connectors.

CITATION LIST

Patent Literature

PTL 1: Japanese Unexamined Patent Application Publication No. 2016-62765

SUMMARY OF THE INVENTION

Technical Problem

The present disclosure provides an image display apparatus and a connecting pin that can reduce generation of unevenness in the luminance of an image displayed on a display panel.

Solution to Problem

An image display apparatus according to the present disclosure includes: a display panel that displays an image on a front surface; a first substrate which is disposed on a back surface side of the display panel and on which a light source is mounted; a second substrate which is disposed on the back surface side of the display panel and on which a circuit unit is mounted; a first metal member disposed on the first substrate and electrically connected with the light source; a second metal member disposed on the second substrate, electrically connected with the circuit unit, and fitted with the first metal member; and a reflector that is electrically insulative and disposed between the display panel and both of the first substrate and the second substrate so as to cover at least the first metal member and the second metal member, the reflector reflecting light from the light source toward a back surface of the display panel, wherein one of the first metal member and the second metal member includes an index portion, and when the first metal member and the second metal member are fitted with each other, the index portion is covered by an other of the first metal member and the second metal member.

Advantageous Effect of Invention

An image display apparatus according to the present disclosure can reduce generation of unevenness in the luminance of an image displayed on a display panel.

DESCRIPTION OF EXEMPLARY EMBODIMENT

The following describes an embodiment in detail with reference to the drawings as necessary. However, unnecessarily detailed descriptions may be omitted. For example, detailed descriptions of well-known aspects or repetitive descriptions of essentially the same configurations may be omitted. This is to avoid unnecessary redundancy and make the following description easier for those skilled in the art to understand.

Note that the inventor provides the accompanying drawings and the following description not to limit the subject matter of the claims, but to aid those skilled in the art to adequately understand the present disclosure.

Embodiment

Hereinafter, an embodiment will be described with reference to FIG. 1 to FIG. 11.

[1. Overall Configuration of Image Display Apparatus]

Figure 1:
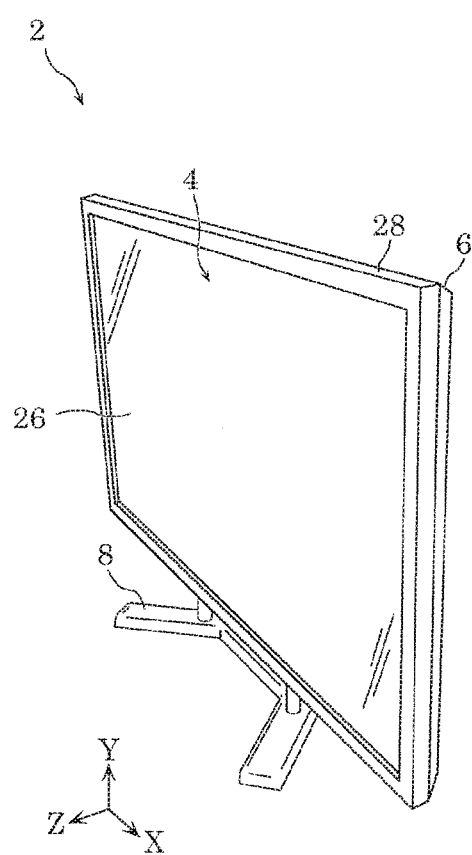
FIG. 1 is a perspective view illustrating an image display apparatus according to an embodiment.
Figure 2:
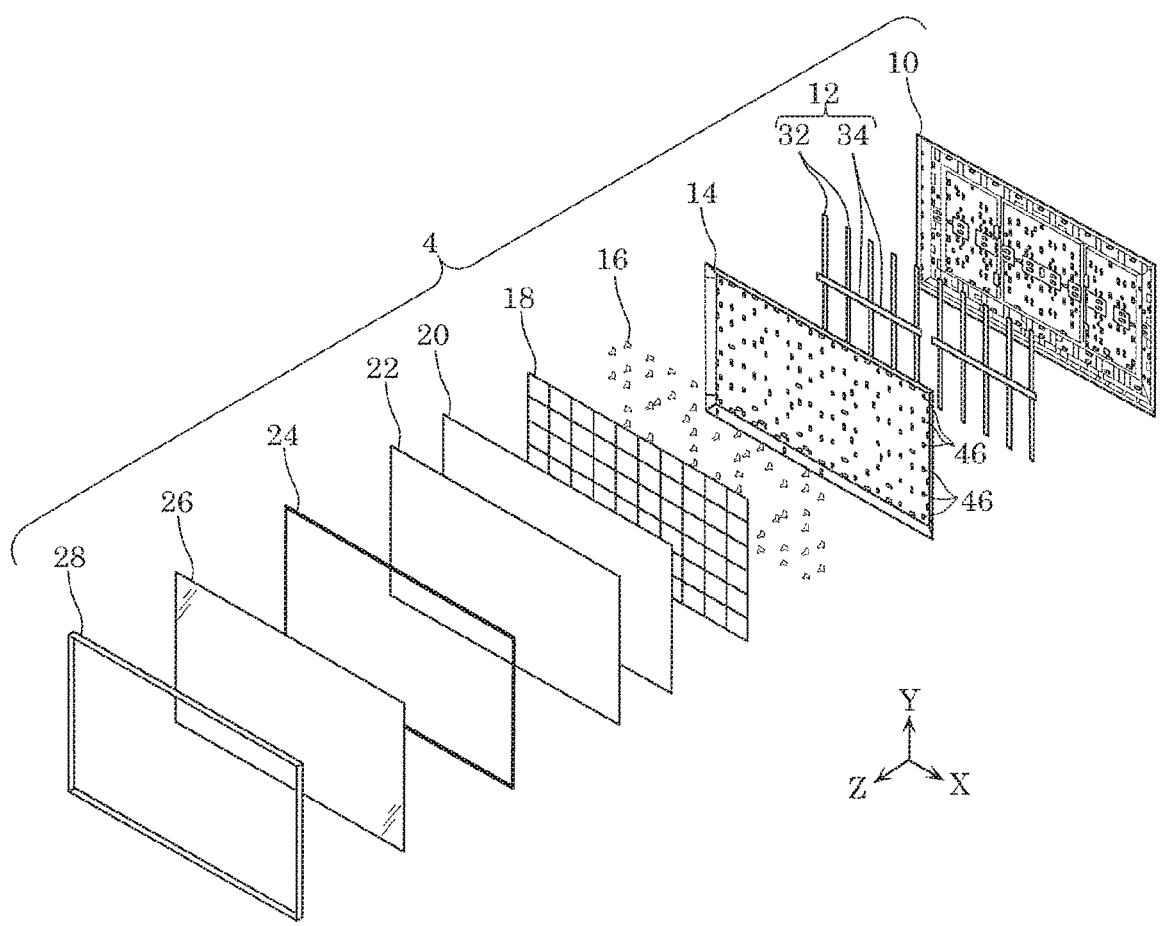
FIG. 2 is an exploded perspective view of a liquid crystal module of an image display apparatus according to the embodiment.
Figure 3:
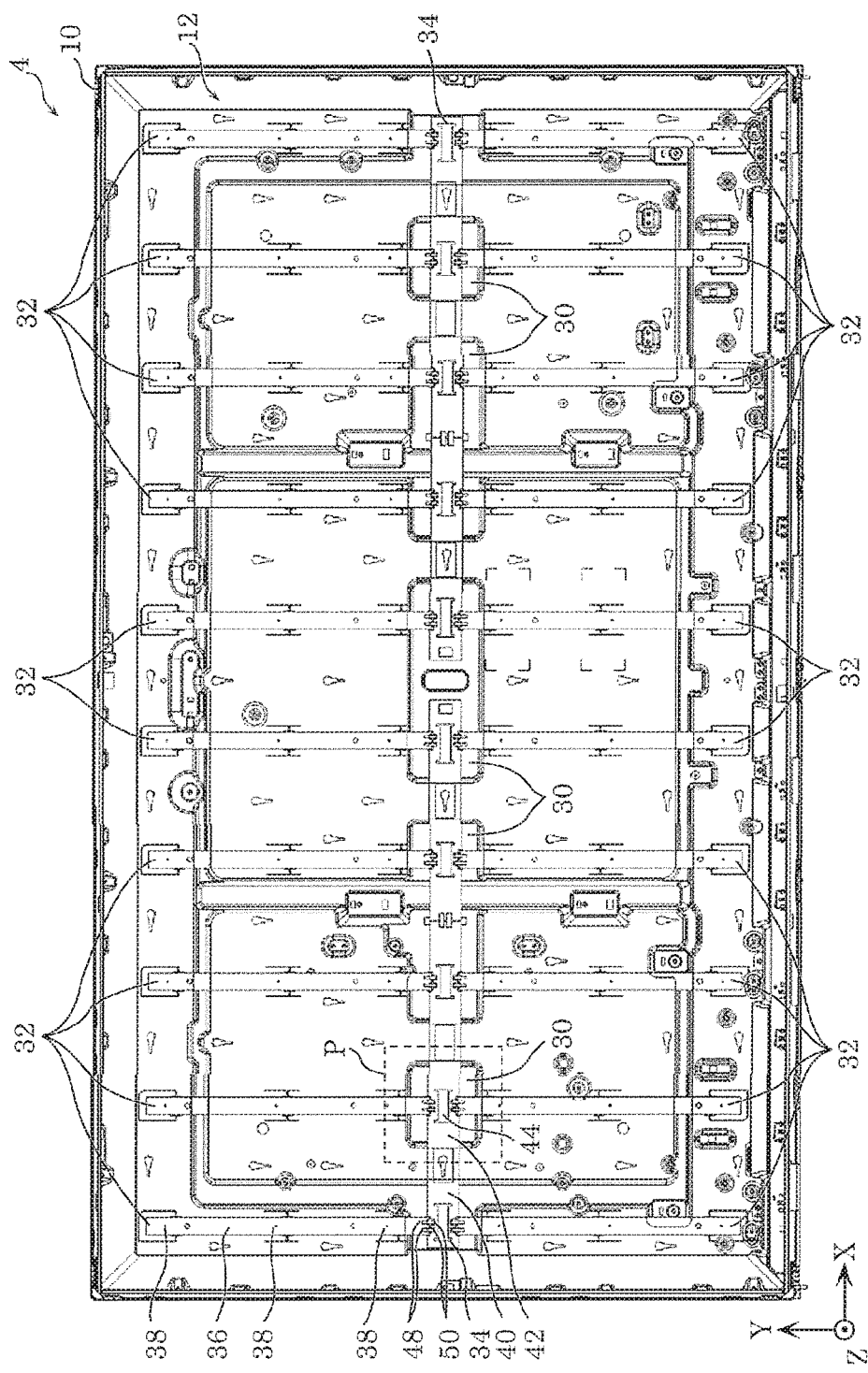
FIG. 3 illustrates a portion of the liquid crystal module according to the embodiment.

First, the overall configuration of image display apparatus 2 according to the embodiment will be described with reference to FIG. 1 to FIG. 3. FIG. 1 is a perspective view illustrating image display apparatus 2 according to the embodiment. FIG. 2 is an exploded perspective view of liquid crystal module 4 of image display apparatus 2 according to the embodiment. FIG. 3 illustrates a portion of liquid crystal module 4 according to the embodiment. Note that FIG. 3 illustrates, among the components of liquid crystal module 4, lower frame 10 and backlight 12 only.

As illustrated in FIG. 1, image display apparatus 2 is a liquid crystal television receiver of the flat panel display type, for example. Image display apparatus 2 includes liquid crystal module 4, back cover 6 that covers the back surface of liquid crystal module 4, and stand 8 that supports liquid crystal module 4.

Liquid crystal module 4 is a unit for displaying an image (including a still image and a moving image). As illustrated in FIG. 2, liquid crystal module 4 includes lower frame 10 (an example of a support member), backlight 12, reflective sheet 14 (an example of a reflector), a plurality of support pins 16, uniform luminance plate 18, diffuser plate 20, optical sheet unit 22, mold frame 24, display panel 26, and bezel 28.

Lower frame 10 supports backlight 12 and optical sheet unit 22, for example, and is also called a base plate. Lower frame 10 is formed using a thin sheet metal and is formed into a rectangular shape in an XY plan view. As illustrated in FIG. 3, a plurality of recessed portions 30 are formed in the front surface of lower frame 10 (a surface closer to display panel 26), corresponding to connecting portions of LED substrates 36 (described later) and relay substrates 40 (described later). Each of the plurality of recessed portions 30 is formed by drawing a sheet metal, for example, and is formed to be depressed toward back cover 6 (the Z axis negative side). The plurality of recessed portions 30 are located at intervals along the longitudinal direction of lower frame 10 (the X axis direction) at the central region of lower frame 10 in a direction (the Y axis direction) transverse to the longitudinal direction of lower frame 10. Further, as illustrated in FIG. 5 described later, each of the plurality of recessed portions 30 has a plurality of through-holes 31 each overlapping with first metal member 48 (described later) and second metal member 50 (described later) fit with each other in the XY plan view. Note that first metal member 48 and second metal member 50 constitute connecting pin 51 for connecting two different members with each other. (see FIG. 4A described later).

Backlight 12 is a direct backlight for emitting light toward the back surface of display panel 26. As illustrated in FIG. 2 and FIG. 3, backlight 12 includes a plurality of LED sheets 32 and a plurality of relay sheets 34.

As illustrated in FIG. 3, each of the plurality of LED sheets 32 is for emitting light and is supported by the front surface of lower frame 10. The plurality of LED sheets 32 are disposed at intervals along the longitudinal direction of lower frame 10, in a region above the central region of lower frame 10 in the transverse direction (the Y axis positive side) and a region below the central region (the Y axis negative side).

Each of the plurality of LED sheets 32 includes elongated LED substrate 36 (an example of a first substrate) and a plurality of LEDs 38 (an example of a light source) mounted on a mounting surface of LED substrate 36. LED substrate 36 is a sheet-shaped flexible printed board having flexibility, and is formed using polyimide, for example. The thickness (size in the Z axis direction) of LED substrate 36 is about 0.1 mm, for example. A reflective layer for reflecting light from the plurality of LEDs 38 is formed on the mounting surface of LED substrate 36. LED substrate 36 is attached to the front surface of lower frame 10 using a double-sided adhesive tape, for example, and is disposed extending along the transverse direction of lower frame 10. The plurality of LEDs 38 are each a chip LED, for example, and are disposed at intervals along the longitudinal direction (the Y axis direction) of LED substrate 36.

As illustrated in FIG. 3, each of the plurality of relay sheets 34 is for electrically relaying the plurality of LED sheets 32 and is supported by the front surface of lower frame 10. The plurality of relay sheets 34 are disposed at intervals along the longitudinal direction of lower frame 10, in the central region of lower frame 10 in the transverse direction.

Each of the plurality of relay sheets 34 includes elongated relay substrate 40 (an example of a second substrate) and circuit unit 42 mounted on a mounting surface of relay substrate 40. Relay substrate 40 is a sheet-shaped flexible printed board having flexibility, and is formed using polyimide, for example. The thickness (size in the Z axis direction) of relay substrate 40 is about 0.1 mm, for example. In the same manner as LED substrate 36, a reflective layer for reflecting light from the plurality of LEDs 38 is formed on the mounting surface of relay substrate 40. Further, a plurality of slits 44 are formed in relay substrate 40 to enhance the flexibility. The plurality of slits 44 are located at intervals along the longitudinal direction of relay substrate 40 (the X axis direction). Relay substrate 40 is attached to the front surface of lower frame 10 using a double-sided adhesive tape, for example, and is disposed extending along the longitudinal direction of lower frame 10. Circuit unit 42 is, for example, an electric circuit for supplying electric power, a control signal, etc. to each of the plurality of LEDs 38 of LED sheets 32.

LED substrate 36 and relay substrate 40 are electrically connected. The present embodiment is characterized in a connecting structure that electrically connects LED substrate 36 and relay substrate 40. The connecting structure for LED substrate 36 and relay substrate 40 will be described later.

Reflective sheet 14 reflects light from the plurality of LEDs 38 toward the back surface of display panel 26. Reflective sheet 14 has flexibility and is formed using, for example, an electrically insulative white resin such as polyethylene terephthalate (PET). Reflective sheet 14 is disposed to cover the plurality of LED sheets 32 and the plurality of relay sheets 34, and is attached to the front surface of lower frame 10 using a double-sided adhesive tape, for example. That is to say, reflective sheet 14 is disposed between display panel 26 and both of the plurality of LED sheets 32 and the plurality of relay sheets 34 so as to cover later-described first metal members 48 and second metal members 50. As illustrated in FIG. 2, reflective sheet 14 has a plurality of holes 46 corresponding to the plurality of LEDs 38. As illustrated in FIG. 5 described later, the plurality of LEDs 38 are inserted through the plurality of holes 46 of reflective sheet 14 to be exposed on the reflective surface of reflective sheet 14 (a surface closer to display panel 26).

Each of the plurality of support pins 16 supports diffuser plate 20. Each support pin 16 is disposed on the reflective surface of reflective sheet 14. Reflective sheet 14 is sandwiched between support pins 16 and lower frame 10. Each support pin 16 includes a flange and a pin protruding from the flange.

Uniform luminance plate 18 makes the luminance of light from the plurality of LEDs 38 uniform, and is what is known as Flatter (registered trademark). Uniform luminance plate 18 is opposed to reflective sheet 14. Uniform luminance plate 18 has a plurality of support holes corresponding to the plurality of support pins 16. With the pins of support pins 16 being inserted through the plurality of support holes, uniform luminance plate 18 is supported by the flanges of support pins 16. Uniform luminance plate 18 also has a plurality of illumination holes different in size. Specifically, in uniform luminance plate 18, illumination holes having an extremely small diameter are formed directly above LEDs 38. The diameter of the illumination holes increases with an increase in distance from LEDs 38. By passing through the plurality of illumination holes of uniform luminance plate 18, the light from the plurality of LEDs 38 can have smoother distribution properties.

Diffuser plate 20 diffuses light from the plurality of LEDs 38. When supported by the pins of the plurality of support pins 16, diffuser plate 20 is opposed to uniform luminance plate 18. Further, a perimeter portion of diffuser plate 20 is supported by lower frame 10. Since diffuser plate 20 further diffuses the light whose distribution properties are made smoother by uniform luminance plate 18, diffuser plate 20 emits light whose luminance is less uneven.

Optical sheet unit 22 includes a plurality of optical sheets having different optical properties. The plurality of optical sheets are disposed, in a state of being overlapped with each other, between display panel 26 and diffuser plate 20. The plurality of optical sheets include, for example, a) a vertical prism sheet for collecting light emitted from diffuser plate 20, b) a horizontal prism sheet for collecting light emitted from diffuser plate 20, c) a reflective polarizing sheet for polarizing light emitted from diffuser plate 20 (for example, Dual Brightness Enhancement Film (DBEF) (registered trademark) sheet of Sumitomo 3M Limited), etc.

Mold frame 24 is formed into a rectangular frame shape in an XY plan view. Mold frame 24 supports display panel 26. The components from optical sheet unit 22 to backlight 12 are sandwiched between mold frame 24 and lower frame 10.

Display panel 26 displays an image. Display panel 26 is what is known as a liquid crystal cell, in which a liquid crystal is sealed between a plurality of glass plates. The front surface of display panel 26 is a display surface for displaying an image. A perimeter portion of display panel 26 is supported by mold frame 24 via a cushion.

Bezel 28 protects the perimeter portion of display panel 26. Bezel 28 is formed into a rectangular frame shape in an XY plan view, and disposed so as to cover the perimeter portion of display panel 26. The components from display panel 26 to lower frame 10 are sandwiched between bezel 28 and back cover 6 (see FIG. 1). Note that bezel 28 is formed using, for example, a resin such as polycarbonate.

As illustrated in FIG. 1, back cover 6 is disposed so as to cover the back surface of lower frame 10 of liquid crystal module 4. Back cover 6 is formed using, for example, a resin such as polycarbonate.

[2. Connecting Structure for LED Substrate and Relay Substrate]

Next, with reference to FIG. 3 to FIG. 10, the connecting structure for LED substrate 36 and relay substrate 40 will be described.

Figure 4A:
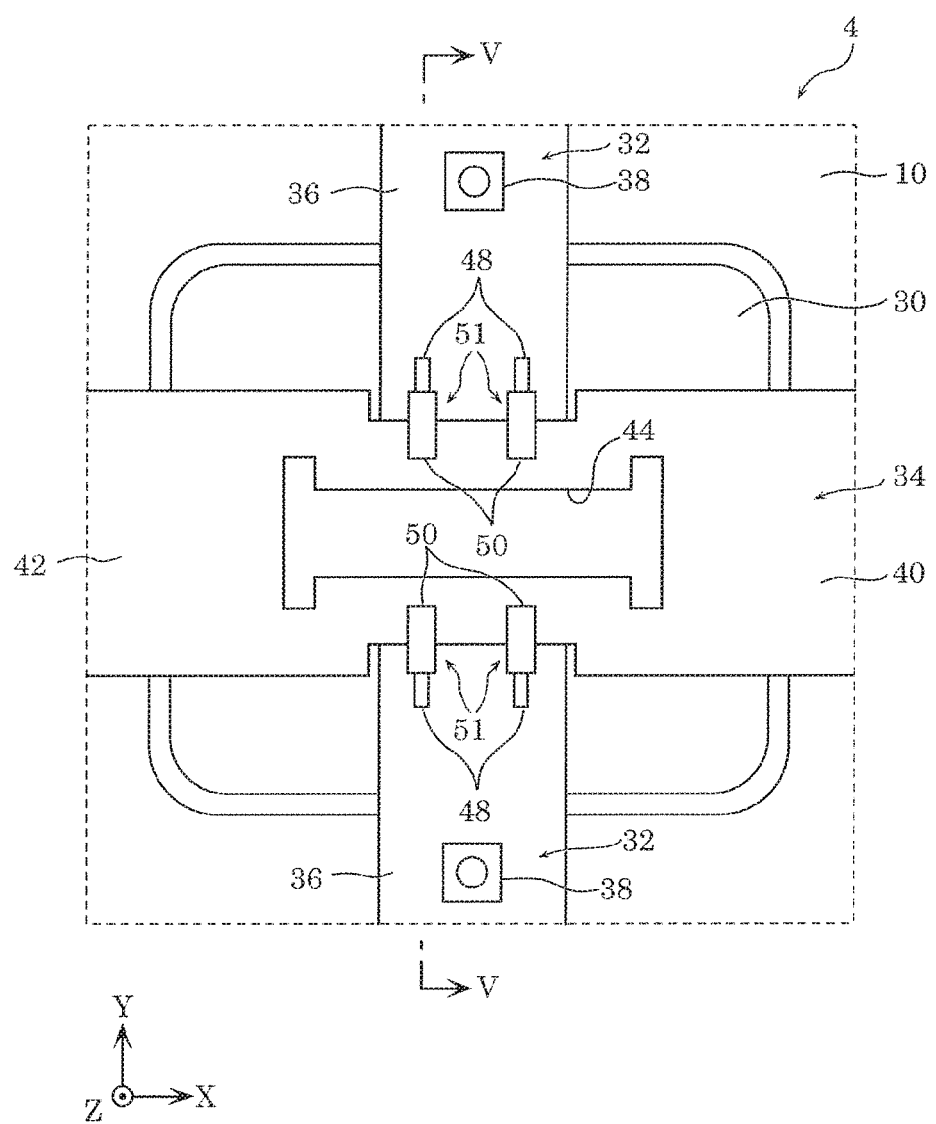
FIG. 4A is an enlarged view of a portion of the liquid crystal module of the image display apparatus according to the embodiment, surrounded by dashedline frame P shown in FIG. 3.
Figure 4B:
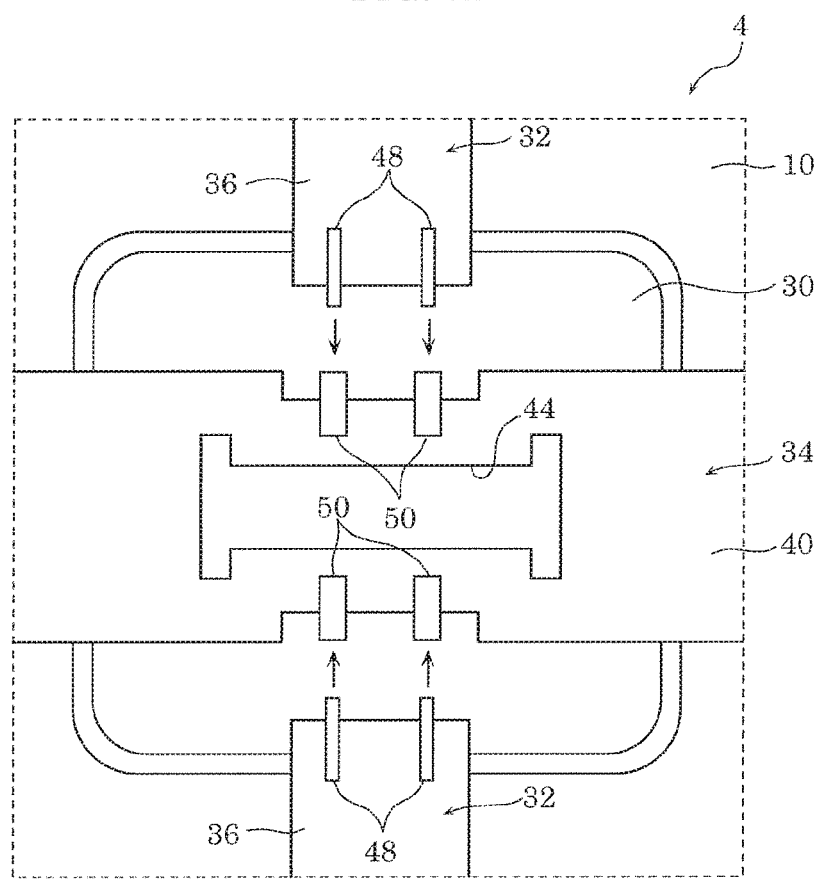
FIG. 4B illustrates the liquid crystal module in FIG. 4A, before an LED substrate and a relay substrate are connected with each other.
Figure 4B:
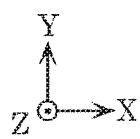
Figure 5:
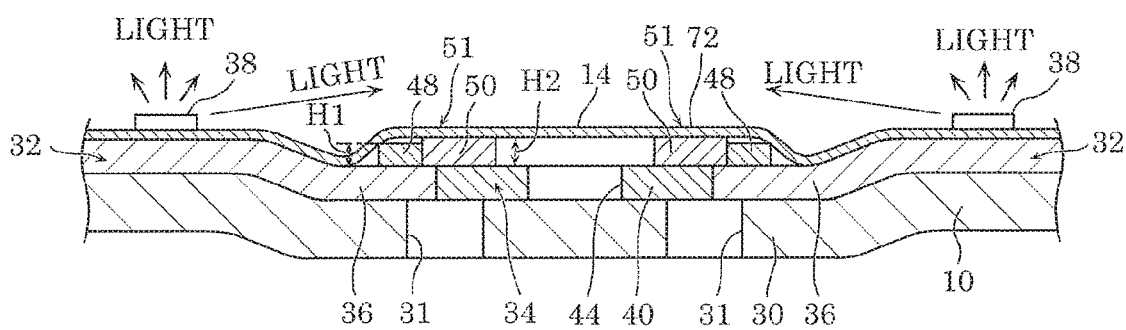
FIG. 5 is a cross-sectional view of the liquid crystal module of the image display apparatus according to the embodiment, taken along line V-V in FIG. 4A.
Figure 5:
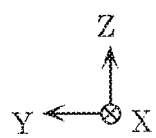

FIG. 4A is an enlarged view of a portion of liquid crystal module 4 of image display apparatus 2 according to the embodiment, surrounded by dashedline frame P shown in FIG. 3. FIG. 4B illustrates liquid crystal module 4 in FIG. 4A, before LED substrate 36 and relay substrate 40 are connected with each other. FIG. 5 is a cross-sectional view of liquid crystal module 4 of image display apparatus 2 according to the embodiment, taken along line V-V in FIG. 4A.

Figure 6:
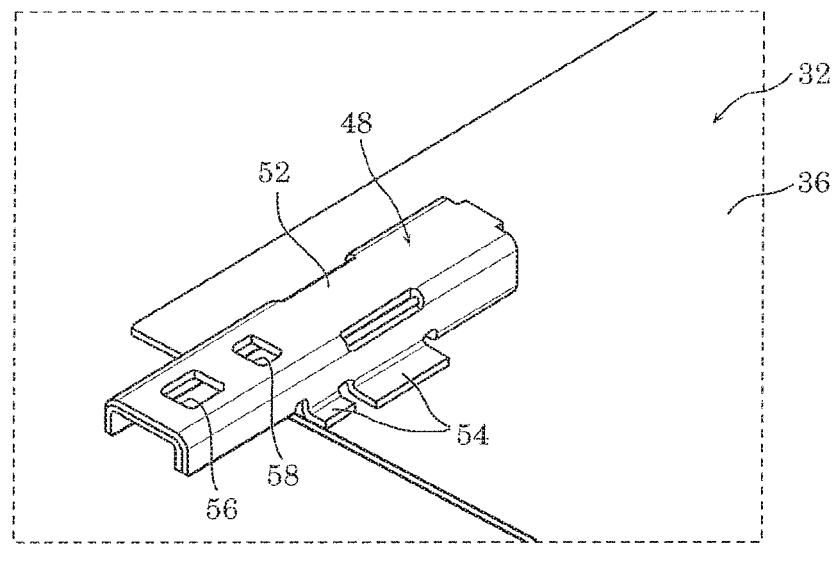
FIG. 6 is an enlarged perspective view of a first metal member according to the embodiment.
Figure 7:
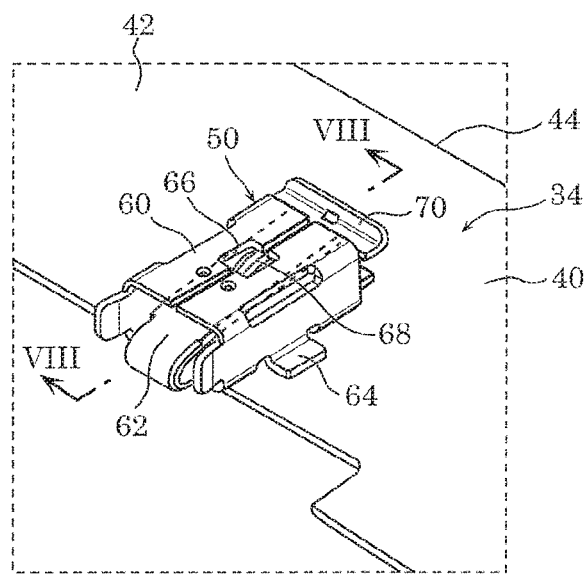
FIG. 7 is an enlarged perspective view of a second metal member according to the embodiment.
Figure 8:
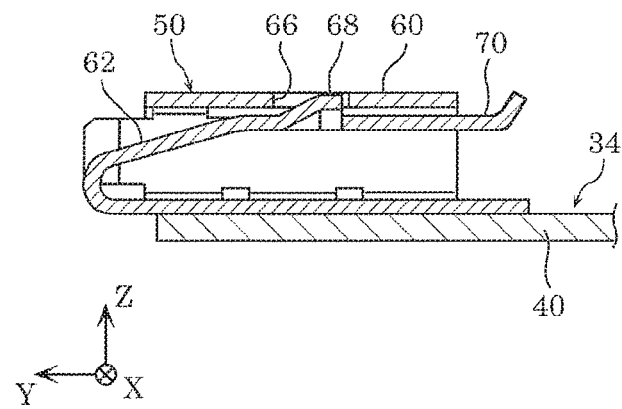
FIG. 8 is a cross-sectional view of the second metal member according to the embodiment, taken along line VIII-VIII in FIG. 7.
Figure 9A:
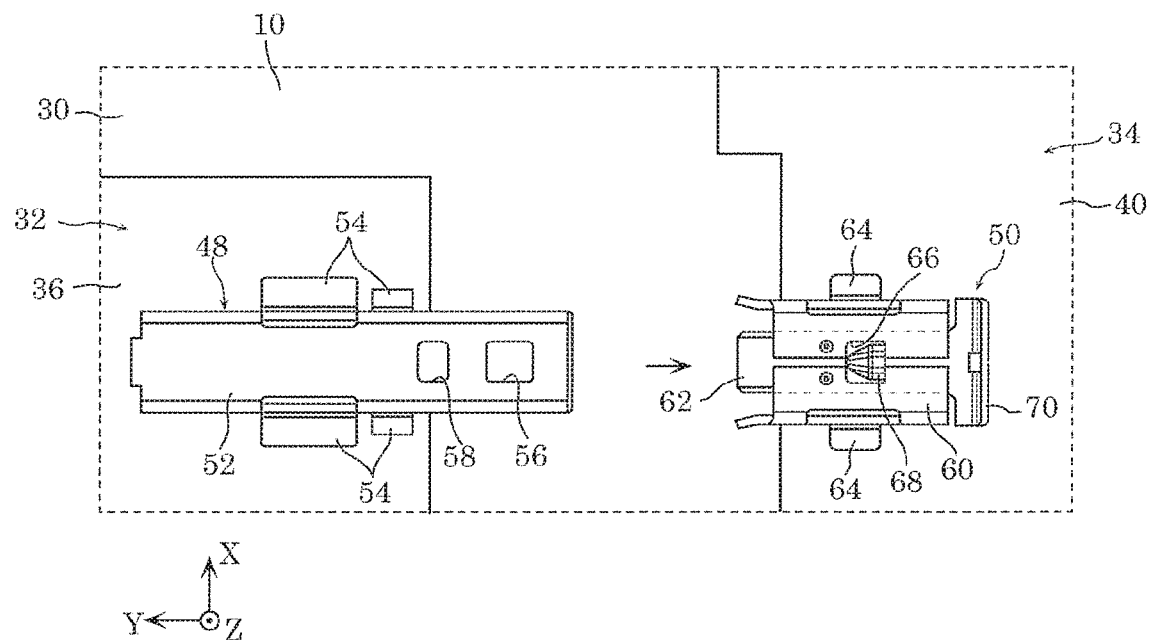
FIG. 9A illustrates the first metal member and the second metal member before being fitted with each other.
Figure 9B:
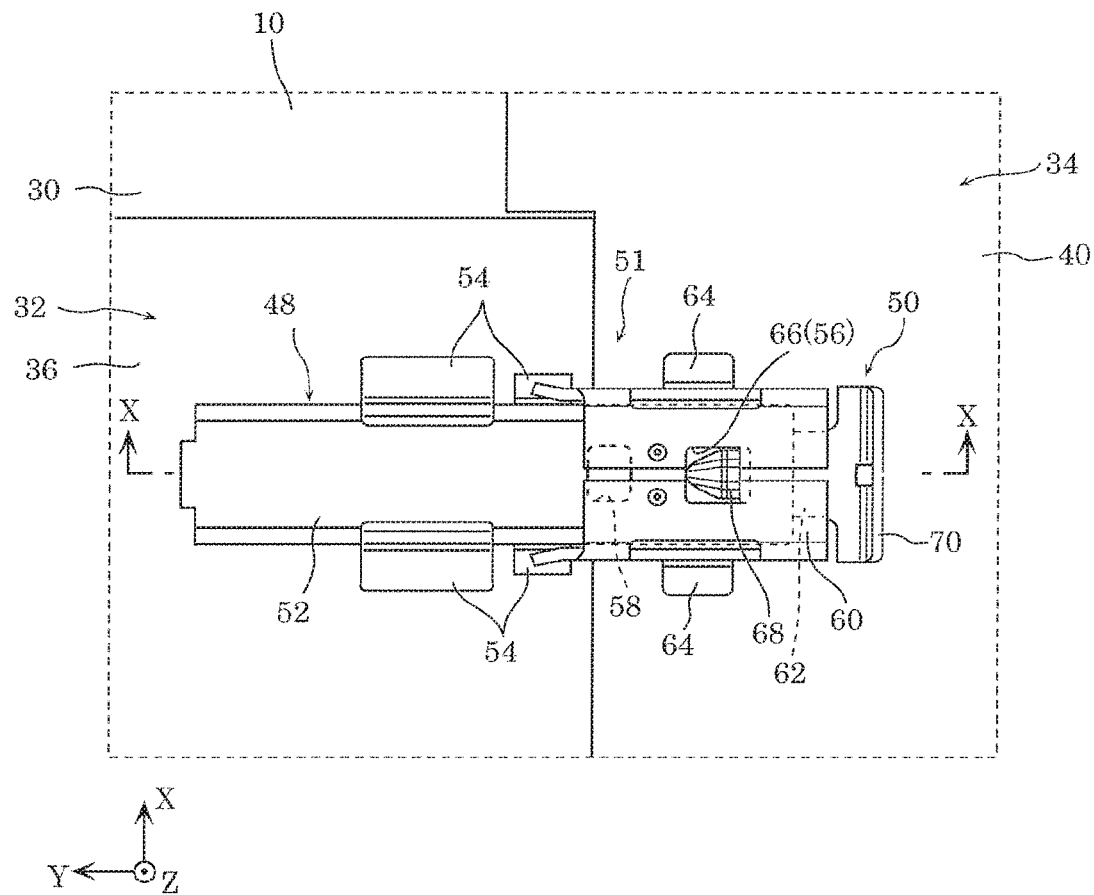
FIG. 9B illustrates the first metal member and the second metal member when fitted with each other.
Figure 10:
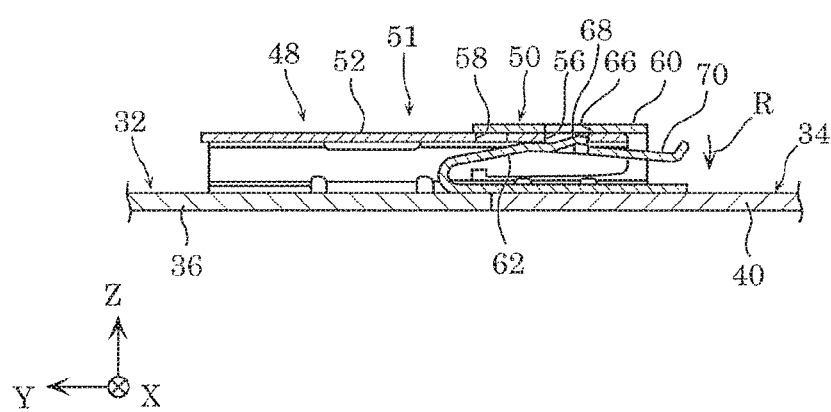
FIG. 10 is a cross-sectional view of the first metal member and the second metal member taken along line X-X in FIG. 9B.

FIG. 6 is an enlarged perspective view of first metal member 48 according to the embodiment. FIG. 7 is an enlarged perspective view of second metal member 50 according to the embodiment. FIG. 8 is a cross-sectional view of second metal member 50 according to the embodiment, taken along line VIII-VIII in FIG. 7. FIG. 9A illustrates first metal member 48 and second metal member 50 before being fitted with each other. FIG. 9B illustrates first metal member 48 and second metal member 50 when fitted with each other. FIG. 10 is a cross-sectional view of first metal member 48 and second metal member 50 taken along line X-X in FIG. 9B.

As illustrated in FIG. 3 and FIG. 4A, a pair of first metal members 48 are disposed at an end portion of LED substrate 36 in the longitudinal direction thereof. Paired first metal members 48 are both mounted on the mounting surface of LED substrate 36 in a state of being exposed, and are disposed with a space therebetween along a direction (the X axis direction) of LED substrate 36 transverse to the longitudinal direction of LED substrate 36. Paired first metal members 48 are both electrically connected to each of the plurality of LEDs 38 mounted on LED substrate 36. As illustrated in FIG. 4B, the respective tip portions of paired first metal members 48 protrude from an end portion of LED substrate 36 in the longitudinal direction thereof. One of paired first metal members 48 functions as a positive electrode terminal, for example, and the other functions as a negative electrode terminal, for example. As illustrated in FIG. 5, height H1 of first metal members 48 from the mounting surface of LED substrate 36 is about 1.5 mm, for example.

As illustrated in FIG. 3 and FIG. 4A, a plurality of pairs of second metal members 50 are disposed at both end portions of relay substrate 40 in the transverse direction thereof (end portions in the Y axis direction). The plurality of pairs of second metal members 50 are disposed at intervals along the longitudinal direction of relay substrates 40. Paired second metal members 50 are both mounted on the mounting surface of relay substrate 40 in a state of being exposed, and are disposed with a space therebetween along the longitudinal direction of relay substrate 40. Paired second metal members 50 are both electrically connected to circuit unit 42 mounted on relay substrate 40. As illustrated in FIG. 4B, the respective tip portions of paired second metal members 50 protrude from an end portion of relay substrate 40 in the transverse direction thereof. One of paired second metal members 50 functions as a positive electrode terminal, for example, and the other functions as a negative electrode terminal, for example. As illustrated in FIG. 5, height H2 of second metal members 50 from the mounting surface of relay substrate 40 is about 1.7 mm, for example.

Paired first metal members 48 are removably fit with a corresponding pair of second metal members 50. As illustrated in FIG. 5, the connecting portion of LED substrate 36 and relay substrate 40 is bent along recessed portion 30 of lower frame 10. That is to say, a pair of first metal members 48 and a pair of second metal members 50 fit with each other are disposed in recessed portion 30 of lower frame 10. Further, the pair of first metal members 48 and the pair of second metal members 50 fit with each other are covered with reflective sheet 14. Note that, for convenience of illustration, first metal members 48 and second metal members 50 are illustrated in a simplified manner in FIG. 3 to FIG. 5.

Next, with reference to FIG. 6 to FIG. 9A, respective configurations of first metal members 48 and second metal members 50 will be described in detail.

As illustrated in FIG. 6 and FIG. 9A, first metal members 48 are, for example, female metal pins formed using an electrically-conductive metal such as phosphor bronze. First metal members 48 each include body portion 52 having an elongated half tubular shape and a plurality of leg portions 54 formed at both end portions of body portion 52 in the transverse direction thereof (end portions in the X axis direction). One end portion of body portion 52 in the longitudinal direction thereof (one end portion in the Y axis direction) protrudes from one end portion of LED substrate 36 in the longitudinal direction thereof. The top surface of body portion 52 (the surface opposed to LED substrate 36) has fitting hole 56 and index hole 58 (an example of an index portion). Fitting hole 56 and index hole 58 are located at positions off-centered toward one end portion of body portion 52 in the longitudinal direction thereof. Index hole 58 is located closer to LED substrate 36 than fitting hole 56 is. Each of the plurality of leg portions 54 is fixed to the mounting surface of LED substrate 36 by, for example, soldering.

As illustrated in FIG. 7, FIG. 8, and FIG. 9A, second metal members 50 are male metal pins formed using an electrically-conductive metal such as phosphor bronze. Second metal members 50 each include body portion 60 having an elongated tubular shape, fitting piece 62 disposed inside body portion 60, and a plurality of leg portions 64 formed at both end portions of body portion 60 in the transverse direction thereof (end portions in the X axis direction). One end portion of body portion 60 in the longitudinal direction thereof (one end portion in the Y axis direction) protrudes from one end portion of relay substrate 40 in the transverse direction thereof. The top surface of body portion 60 (the surface opposed to relay substrate 40) has standby hole 66. Standby hole 66 is located at the central portion of body portion 60 in the longitudinal direction thereof.

As illustrated in FIG. 8, fitting piece 62 is elongated while bending along the longitudinal direction of body portion 60. One end portion of fitting piece 62 in the longitudinal direction thereof is connected to the bottom surface of body portion 60 (the surface closer to relay substrate 40). Operation portion 70 protruding outside body portion 60 is formed at the other end portion of fitting piece 62 in the longitudinal direction thereof. Fitting protrusion 68 is formed at the central portion of fitting piece 62 in the longitudinal direction thereof by, for example, cutting and raising processing. Fitting piece 62 is biased toward the top surface of body portion 60. Thus, when no external force is upon operation portion 70, fitting protrusion 68 is in standby hole 66 of body portion 60. Each of the plurality of leg portions 64 is fixed to the mounting surface of relay substrate 40 by, for example, soldering.

Next, with reference to FIG. 9A to FIG. 10, a procedure for fitting first metal member 48 and second metal member 50 with each other will be described in detail.

First, as illustrated in FIG. 9A, one end portion of body portion 52 of first metal member 48 in the longitudinal direction thereof is inserted into body portion 60 of second metal member 50 from one end portion of body portion 60 in the longitudinal direction thereof. Here, the end portion of body portion 52 in the longitudinal direction thereof is inserted between the top surface of body portion 60 and fitting piece 62 while pressing down fitting piece 62 in a direction (the Z axis negative direction) in which fitting piece 62 separates from the top surface of body portion 60. Accordingly, fitting protrusion 68 is pulled out from standby hole 66.

As illustrated in FIG. 9B and FIG. 10, when standby hole 66 of body portion 60 overlaps fitting hole 56 of body portion 52 in an XY plan view, fitting protrusion 68 is fitted into fitting hole 56 by the biasing force of fitting piece 62. Accordingly, first metal member 48 and second metal member 50 are fitted with each other, thereby electrically connecting LED substrate 36 and relay substrate 40.

As illustrated in FIG. 9B, when first metal member 48 and second metal member 50 are fitted with each other, index hole 58 of body portion 52 is covered with the top surface of body portion 60 and thus becomes invisible from outside. On the other hand, when first metal member 48 and second metal member 50 are not fitted with each other, index hole 58 of body portion 52 is present outside the top surface of body portion 60, and is thus visible from outside. Accordingly, by visually checking whether or not index hole 58 of body portion 52 is visible, a user can easily determine whether or not first metal member 48 and second metal member 50 are fitted with each other.

Note that to disengage first metal member 48 and second metal member 50 from each other, the user presses down operation portion 70 of second metal member 50 with a finger etc. in the direction indicated by arrow R in FIG. 10. By doing so, fitting protrusion 68 is pulled out from fitting hole 56, disengaging first metal member 48 and second metal member 50 from each other. In this state, the user can remove first metal member 48 from second metal member 50.

[3. Advantageous Effects Etc.]

Figure 11:
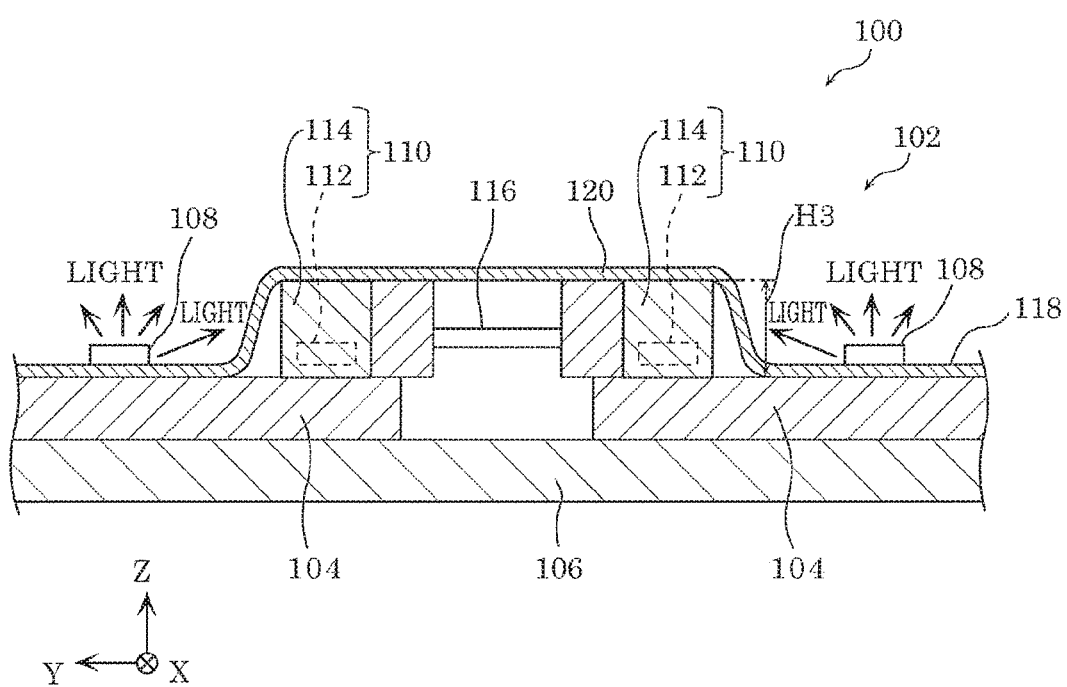
FIG. 11 is an enlarged cross-sectional view of a portion of a liquid crystal module of an image display apparatus according to a comparative example.

Here, with reference to FIG. 11, the following describes a configuration of liquid crystal module 102 of image display apparatus 100 according to a comparative example. FIG. 11 is an enlarged cross-sectional view of a portion of liquid crystal module 102 of image display apparatus 100 according to the comparative example.

As illustrated in FIG. 11, in liquid crystal module 102 of image display apparatus 100 according to the comparative example, a plurality of LED substrates 104 are supported by lower frame 106. Each of the plurality of LED substrates 104 is formed using a rigid substrate. LED 108 and connector 110 are mounted on the mounting surface of each LED substrate 104. Connector 110 includes metal terminal 112 and resin housing 114 covering metal terminal 112. Connector 110 on one LED substrate 104 is electrically connected with connector 110 on another LED substrate 104 via lead wire 116 having connectors.

Since connector 110 includes housing 114, height H3 of connector 110 from LED substrate 104 is as high as 3 mm to 5 mm, for example. For this reason, when reflective sheet 118 is attached to lower frame 106, bulge portion 120 largely bulging locally due to connectors 110 is formed in reflective sheet 118. As a consequence, bulge portion 120 of reflective sheet 118 blocks a portion of light from LEDs 108, resulting in a problem of generation of unevenness in the luminance of an image displayed on the display panel (not illustrated).

In contrast, according to the present embodiment, image display apparatus includes: display panel 26 that displays an image on a front surface; LED substrate 36 which is disposed on a back surface side of display panel 26 and on which LED 38 is mounted; relay substrate 40 which is disposed on the back surface side of display panel 26 and on which circuit unit 42 is mounted; first metal member 48 disposed on LED substrate 36 and electrically connected with LED 38; second metal member 50 disposed on relay substrate 40, electrically connected with circuit unit 42, and fitted with first metal member 48; and reflective sheet 14 that is electrically insulative and disposed between display panel 26 and both of LED substrate 36 and relay substrate 40 so as to cover at least first metal member 48 and second metal member 50, reflective sheet 14 reflecting light from LED 38 toward a back surface of display panel 26. One of first metal member 48 and second metal member 50 includes index hole 58. When first metal member 48 and second metal member 50 are fitted with each other, index hole 58 is covered by the other of first metal member 48 and second metal member 50.

This makes it possible, as illustrated in FIG. 5, to keep low height H1 of first metal member 48 from the mounting surface of LED substrate 36 and height H2 of second metal member 50 from the mounting surface of relay substrate 40. Accordingly, it is possible to keep small the size of bulge portion 72 formed in reflective sheet 14 due to first metal member 48 and second metal member 50. As a result, it is possible to inhibit bulge portion 72 of reflective sheet 14 from blocking a portion of light from LEDs 38, thereby making it possible to reduce generation of unevenness in the luminance of an image displayed on display panel 26. Further, since first metal member 48 and second metal member 50 are covered with reflective sheet 14 that is electrically insulative, it is possible to ensure electrical insulation between each of first metal member 48 and second metal member 50 and other electrically conductive members. Moreover, by using, as the connecting structure for LED substrate 36 and relay substrate 40, first metal member 48 and second metal member 50 fitted with each other, it is possible to simplify the layout of the wire between LED substrate 36 and relay substrate 40. In addition, by visually checking whether or not index hole 58 is visible, the user can easily determine whether or not first metal member 48 and second metal member 50 are fitted with each other.

Further, in the present embodiment, each of LED substrate 36 and relay substrate 40 has flexibility.

Accordingly, by bending each of LED substrate 36 and relay substrate 40, it is possible to relieve stress generated between first metal member 48 and second metal member 50, thereby making it possible to reduce the occurrence of an electrical connection failure between first metal member 48 and second metal member 50.

Further, in the present embodiment, image display apparatus 2 further includes lower frame 10 that is disposed on the back surface side of display panel 26 and supports LED substrate 36 and relay substrate 40. Lower frame 10 includes recessed portion 30 in which first metal member 48 and second metal member 50 are disposed.

Accordingly, as illustrated in FIG. 5, recessed portion 30 of lower frame 10 can absorb height H1 of first metal member 48 from the mounting surface of LED substrate 36 and height H2 of second metal member 50 from the mounting surface of relay substrate 40. As a result, it is possible to keep even smaller the size of bulge portion 72 formed in reflective sheet 14 due to first metal member 48 and second metal member 50.

Further, in the present embodiment, lower frame 10 further includes through-hole 31 in recessed portion 30. Through-hole 31 overlaps with first metal member 48 and second metal member 50 in a plan view.

This makes it possible to inhibit first metal member 48 and second metal member 50 from contacting lower frame 10, thereby ensuring electrical insulation between lower frame 10 and each of first metal member 48 and second metal member 50.

Further, in the present embodiment, connecting pin 51 includes first metal member 48 and second metal member 50 fitted with first metal member 48. One of first metal member 48 and second metal member 50 includes index portion 58. When first metal member 48 and second metal member 50 are fitted with each other, index portion 58 is covered by the other of first metal member 48 and second metal member 50.

Accordingly, by visually checking whether or not index hole 58 is visible, the user can easily determine whether or not first metal member 48 and second metal member 50 are fitted with each other.

Other Embodiments

As presented above, an embodiment has been described as an example of the techniques disclosed in the present application. However, the techniques according to the present disclosure are not limited to the foregoing embodiment, and can also be applied to embodiments obtained through modification, replacement, addition, omission, etc. to the above embodiment as appropriate. Furthermore, it is possible to make a new embodiment by combining the structural elements described in the above embodiment.

In view of the above, the following describes other embodiments.

Although recessed portions 30 are formed in lower frame 10 in the above embodiment, the present disclosure is not limited to this, and recessed portions 30 may be omitted from lower frame 10. Even in this case, it is possible to keep small the size of bulge portion 72 formed in reflective sheet 14 due to first metal member 48 and second metal member 50, thereby making it possible to reduce generation of unevenness in the luminance of an image displayed on display panel 26.

Although index hole 58 is formed in body portion 52 of first metal member 48 as an index portion in the above embodiment, the present disclosure is not limited to this. For example, (a) a mark such as print or a sticky label, (b) a protrusion, (c) a recess, or (d) a notch may be formed in body portion 52 of first metal member 48 as an index portion.

Although circuit unit 42 in the above embodiment includes an electric circuit for supplying electric power, a control signal, etc. to each of the plurality of LEDs 38, the present disclosure is not limited to this, and circuit unit 42 may include any circuit.

Although first metal members 48 are female metal pins and second metal members 50 are male metal pins in the above embodiment, they can be reversed. That is, first metal members 48 may be male metal pins and second metal members 50 may be female metal pins.

As presented above, embodiments have been described as examples of the techniques according to the present disclosure. The accompanying drawings and detailed description have been provided for this purpose.

Therefore, the structural elements illustrated in the accompanying drawings and described in the detailed description may include not only structural elements essential to solving the problem but also structural elements not essential to solving the problem, in order to provide examples of the above-described techniques. As such, these non-essential structural elements should not be deemed essential due to the mere fact that they are included in the accompanying drawings and the detailed description.

Moreover, since the embodiments above show examples of the techniques according to the present disclosure, various modifications, replacements, additions, omissions, etc. can be made within the scope of the claims or in a scope equivalent thereto.

INDUSTRIAL APPLICABILITY

The present disclosure is applicable to an image display apparatus that displays an image. Specifically, the present disclosure is applicable to an image display apparatus such as a liquid crystal television receiver.

REFERENCE MARKS IN THE DRAWINGS 2, 100 image display apparatus
4, 102 liquid crystal module
6 back cover
8 stand
10, 106 lower frame
12 backlight
14, 118 reflective sheet
16 support pin
18 uniform luminance plate
20 diffuser plate
22 optical sheet unit
24 mold frame
26 display panel (liquid crystal cell)
28 bezel
30 recessed portion
31 through-hole
32 LED sheet
34 relay sheet
36, 104 LED substrate
38, 108 LED
40 relay substrate
42 circuit unit
44 slit
46 hole
48 first metal member
50 second metal member
51 connecting pin
52, 60 body portion
54, 64 leg portion
56 fitting hole
58 index hole
62 fitting piece
66 standby hole
68 fitting protrusion
70 operation portion
72, 120 bulge portion
110 connector
112 metal terminal
114 housing
116 lead wire

The invention claimed is:

1. An image display apparatus, comprising:
a display panel that displays an image on a front surface;
a first substrate which is disposed on a back surface side of the display panel and on which a light source is mounted;
a second substrate which is disposed on the back surface side of the display panel and on which a circuit unit is mounted;
a first metal member disposed on the first substrate and electrically connected with the light source;
a second metal member disposed on the second substrate, electrically connected with the circuit unit, and fitted with the first metal member; and
a reflector that is electrically insulative and disposed between the display panel and both of the first substrate and the second substrate so as to cover at least the first metal member and the second metal member, the reflector reflecting light from the light source toward a back surface of the display panel, wherein
one of the first metal member and the second metal member includes an index portion, and
when the first metal member and the second metal member are fitted with each other, the index portion is covered by an other of the first metal member and the second metal member.

2. The image display apparatus according to claim 1, wherein each of the first substrate and the second substrate has flexibility.

3. The image display apparatus according to claim 2, further comprising:
a support member that is disposed on the back surface side of the display panel and supports the first substrate and the second substrate, wherein
the support member includes a recessed portion in which the first metal member and the second metal member are disposed.

4. The image display apparatus according to claim 3, wherein the support member further includes a through-hole in the recessed portion, the through-hole overlapping with the first metal member and the second metal member in a plan view.

* * * * *